(No Model.)
R. VOSE.
CAR SPRING.
No. 302,964. Patented Aug. 5, 1884.
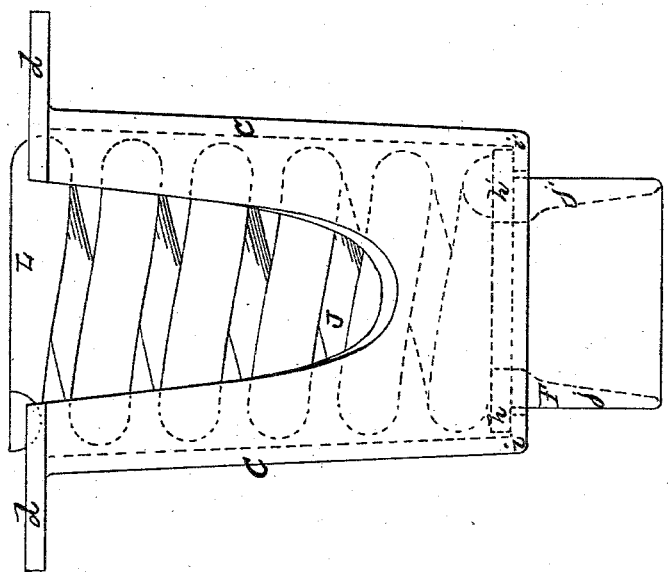
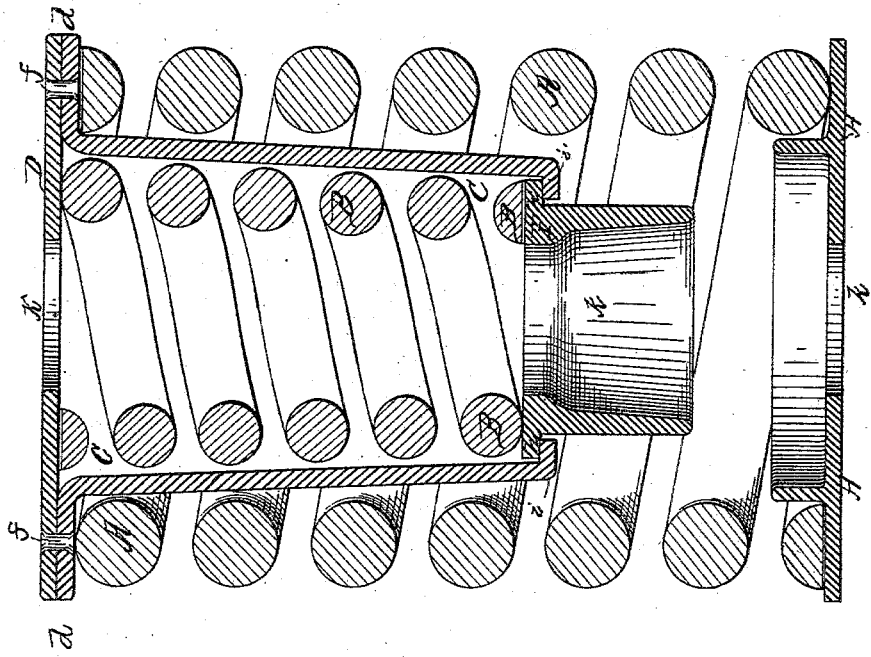
Witnesses:
Henry Eichling
B. F. Clark
Inventor
Rich'd Vose

UNITED STATES PATENT OFFICE.

RICHARD VOSE, OF NEW YORK, N. Y.

CAR-SPRING.

SPECIFICATION forming part of Letters Patent No. 302,964, dated August 5, 1884.

Application filed April 9, 1884. (No model.)

*To all whom it may concern:*

Be it known that I, RICHARD VOSE, of the city of New York, county and State of New York, am the inventor of an Improvement in Car-Spring Holders and Car-Springs, of which the following is a specification, reference being had to the drawings accompanying the same.

My invention consists in constructing a holder for interior springs, when a graduated spring is required, in such a manner that the interior spring is not only protected from chafing by coming into contact with the exterior spring, but also from rattling or shaking, so as to be broken; and it consists in fastening the interior spring in a holder, then riveting the top onto the holder over the spiral, just decreasing the spring sufficiently to cause it to always have a certain pressure on the lid and bottom of said holder. Thus constructed, my interior spring is portable and always ready for use.

In the drawings, Figure 1 shows an exterior spring-holder cover and interior spring in section. Fig. 2 shows one side or section of my improved holder, the cut-away in its side, and the interior spring in dotted lines in position, the lid being removed, also the cushion or seat of the said holder, as hereinafter described.

A is the exterior spring, cylindrical in shape.

B is the interior spring, conical in shape, as shown herein; but it may be cylindrical also when desired.

C is the cup-holder for the interior spring, having sides $c\ c'$ and flanges $d\ d$, which rest on top of spring A.

D is the top or cover of said holder, having opening $k$, through which the pin or rod holding the spring in position is let through. The lid D is riveted, after the interior spring is in position, to the cup or holder C through flanges $d\ d$ by means of rivets or screws $f\ f$. In the bottom of the holder is the aperture usually found in the bottom of cups, and F is the cushion resting therein, the lips $h\ h'$ of cushion F resting on lips $i\ i'$ of cup C. The cushion F has sides $j\ j'$ projecting downward, which hang free of contact when but a light pressure is brought to bear.

H is the cap or covering used in covering the ends of springs. Through the cap H and cushion F is left the aperture $k$, the same extending up through C for the passage of the pin or rod usually employed to hold caps and springs together.

J is an aperture cut out of cup C, so as to make it lighter, but in no wise weakening its ability for use.

In Fig. 2 the cup C is first taken and the cushion F is dropped in, the lips $h\ h'$ resting on lips $i\ i'$ of cup C. The interior spring, of any shape, is now dropped into the holder C, and its upper end, L, Fig. 2, will project up and above the surface of flanges $d\ d$. The top D is now placed on over end L and riveted down to flanges $d\ d$. It may, if desired, be fastened by screws. The spring B has to be compressed into the cup, in order to allow the top D to come tight down onto flanges $d\ d$. The top D now made secure, the interior spring cannot by any means rattle nor change its position to any degree from a horizontal one, and is always ready for action, when by pressing the exterior spring the cushion F is brought against cap H, when the cushion is pushed up against the lower end of the interior spiral, thus bringing it into play as an auxiliary and assistant spring. The cup containing the interior spring so confined is thus always ready to be located into working position inside of an exterior spring, where all are held firmly together by the usual methods employed. The sides of cushion F may be of any desired length, as may be required to bring action onto the interior spring sooner or later. The cap covering the upper end of the spring thus combined, being similar and like to covering H, rests over cap D and on the same.

What I claim, and desire to secure by Letters Patent, is—

1. An improved car-spring consisting of the holder having lid D riveted thereto, in combination with a spiral spring confined therein, substantially as described, and for the purpose specified.

2. An improved car-spring having, in combination with a cup or holder, interior spiral spring, riveted top or covering placed therein, and the cushion or bottom movable up and down longitudinally, substantially as shown, and for the purpose specified.

RICHD. VOSE.

Witnesses:
 B. S. CLARK,
 NATHAN LEVANSON.